(12) United States Patent
Chang et al.

(10) Patent No.: US 11,259,534 B2
(45) Date of Patent: Mar. 1, 2022

(54) DEODORIZED GOAT/SHEEP MILK, METHOD FOR PRODUCING THE SAME AND GOAT/SHEEP MILK PRODUCTS

(71) Applicant: Inner Mongolia Yili Industrial Group Co., Ltd., Hohhot (CN)

(72) Inventors: Pengfei Chang, Hohhot (CN); Biao Liu, Hohhot (CN); Xiaoyu Kong, Hohhot (CN)

(73) Assignee: INNER MONGOLIA YILI INDUSTRIAL GROUP CO., LTD., Hohhot (CN)

( * ) Notice: Subject to any disclaimer, the term of this patent is extended or adjusted under 35 U.S.C. 154(b) by 34 days.

(21) Appl. No.: 16/635,885

(22) PCT Filed: Jul. 26, 2018

(86) PCT No.: PCT/CN2018/097139
§ 371 (c)(1),
(2) Date: Jan. 31, 2020

(87) PCT Pub. No.: WO2019/029371
PCT Pub. Date: Feb. 14, 2019

(65) Prior Publication Data
US 2020/0352186 A1    Nov. 12, 2020

(30) Foreign Application Priority Data

Aug. 9, 2017  (CN) .......................... 201710673350.8

(51) Int. Cl.
| A23C 7/04 | (2006.01) |
| A23C 9/123 | (2006.01) |
| A23C 9/16 | (2006.01) |
| A23C 19/00 | (2006.01) |
| A23C 21/00 | (2006.01) |
| A23J 1/20 | (2006.01) |

(52) U.S. Cl.
CPC ................ *A23C 7/04* (2013.01); *A23C 9/123* (2013.01); *A23C 9/16* (2013.01); *A23C 19/00* (2013.01); *A23C 21/00* (2013.01); *A23J 1/205* (2013.01)

(58) Field of Classification Search
CPC .. A23C 7/04; A23C 9/123; A23C 9/16; A23C 19/00; A23C 21/00; A23J 1/205
USPC ....................................................... 426/582
See application file for complete search history.

(56) References Cited

U.S. PATENT DOCUMENTS

2006/0062890 A1* 3/2006 Delgado Araujo ..... A23L 11/33
426/634

FOREIGN PATENT DOCUMENTS

| CN | 106472681 A | * | 3/2017 |
| WO | WO-2006032967 A2 | | 3/2006 |

OTHER PUBLICATIONS

Translation of Zhong et al. (also referred to at Yi Minzhi) CN-106472681-A (Year: 2017).*
International Search Report and Translation of the ISR for PCT/CN2018/097139, dated Oct. 11, 2018 (8 pages).

* cited by examiner

*Primary Examiner* — Brent T O'Hern
(74) *Attorney, Agent, or Firm* — Pillsbury Winthrop Shaw Pittman, LLP

(57) ABSTRACT

The invention discloses a method for producing a deodorized goat/sheep milk, which method comprises purifying fresh goat/sheep milk or goat/sheep full cream, wherein the material is subjected to a carbon dioxide treatment during the purification, and the carbon dioxide treatment comprises: introducing carbon dioxide into the material, then refrigerating the material, and removing carbon dioxide. The producing method of the invention is simple, and has a good effect of removing muttony odor of goat/sheep milk. The present invention also discloses a deodorized goat/sheep milk and a deodorized goat/sheep milk product.

9 Claims, No Drawings

DEODORIZED GOAT/SHEEP MILK, METHOD FOR PRODUCING THE SAME AND GOAT/SHEEP MILK PRODUCTS

CROSS-REFERENCE TO RELATED APPLICATIONS

This application is a § 371 National Stage of International (PCT) Application No. PCT/CN2018/097139, filed Jul. 26, 2018, which claims the benefit of and priority to Chinese Application No. 201710673350.8, filed Aug. 9, 2017, the content of which is hereby incorporated by reference in their entirety.

TECHNICAL FIELD

The present invention relates to the field of production of milk products. More specifically, the present invention relates to a deodorized goat/sheep milk, a method for producing the same, and a goat/sheep milk product.

BACKGROUND ART

Goat/sheep milk has a high nutritional value, is rich in proteins, fats, minerals, vitamins and various biologically active substances, and has a certain dietetically therapeutic effect and health-care effect. Although goat/sheep milk is favored in many countries around the world, the strong muttony odor of goat/sheep milk is an important factor restricting its popularity in China, affecting the development and utilization of goat/sheep milk products. Therefore, the technical problem of removing muttony odor of goat/sheep milk must be solved to promote the development in goat/sheep milk industry.

At present, there are many methods for removing muttony odor of goat/sheep milk, such as physical deodorizing process, chemical deodorizing process and biological deodorizing process. However, different deodorizing processes have show specific deficiencies in practical applications.

Physical deodorizing process: at present, a good physical deodorizing method mainly comprises deodorizing goat/sheep milk by using flash evaporation and embedding with β-cyclodextrin, wherein the underlying mechanism is that the complex in goat/sheep milk is embedded with β-cyclodextrin, saturated at high pressure, placed into a low-pressure vessel, and subjected to vacuum evaporation and cooling in according to the fact that the boiling point of a solution decreases as the pressure drops, whereby the odor is removed. In addition, in a process of processing of goat/sheep milk powder, deodorizing can be carried out by steam jetting, and the mechanism thereof is mainly to form vacuum evaporation by continuous decompression, so that the fatty acid in goat/sheep milk is volatilized, thereby reducing the influence of internal chemical components on the goat/sheep milk, and thereby reducing the muttony odor of the goat/sheep milk. The main purpose of physical deodorizing process is to remove medium-chain fatty acids (MCFA) having 8-12 carbon atoms from goat/sheep milk to achieve the deodorizing effect. However, as compared with long-chain fatty acids, MCFA is more easier to be absorbed and has a faster absorption rate, can be rapidly oxidized in vivo to provide energy, and also has the effect of improving lipid metabolism and glucose metabolism. Therefore, the physical deodorizing process will reduce the nutrition of goat/sheep milk to a certain extent, and has high requirements on equipment, large investment, and limited application.

Chemical deodorizing process: chemical deodorizing process mainly comprises adding a small amount of almonds, red dates and orange peel to goat/sheep milk, or directly adding jasmine tea, when goat/sheep milk is cooked, which can effectively remove the muttony odor of goat/sheep milk. However, the color of the deodorized goat/sheep milk is yellow, and the sensory state such as flavor and taste are slightly changed. The application of the process is limited and cannot be extended to industrial production.

Biological deodorizing process: biological deodorizing process is also a typical process for removing muttony odor from goat/sheep milk, which comprises adding a microorganism such as lactic acid bacteria as a deodorizing agent to the goat/sheep milk, and removing the muttony odor of the goat/sheep milk by the microbial fermentation. This process is often used in the production of cheese, goat/sheep milk wine and goat/sheep milk yogurt, and there is obvious limitation.

It can be seen that the current techniques for removing muttony odor of goat/sheep milk are not mature, and there are still various problems, directly limiting the development of the goat/sheep milk industry. Therefore, there is a need to provide a new process for removing muttony odor of goat/sheep milk, so that the goat/sheep milk can be better applied in the dairy industry.

SUMMARY OF THE INVENTION

In view of the above problems, a first object of the present invention is to provide a method for producing a deodorized goat/sheep milk.

A second object of the present invention is to provide a deodorized goat/sheep milk.

A third object of the present invention is to provide a goat/sheep milk product.

In order to achieve the above first object, the present invention provides a method for producing a deodorized goat/sheep milk, which method comprises purifying fresh goat/sheep milk or goat/sheep full cream, wherein the material is subjected to a carbon dioxide treatment during the purification, and the carbon dioxide treatment comprises: introducing carbon dioxide into the material, then refrigerating the material, and removing carbon dioxide.

The goat/sheep full cream in the present invention is produced by sterilizing, dehydrating and spray drying fresh goat/sheep milk. In addition, unless otherwise specified in the present invention, said material refers to a raw material required in the process for producing the deodorized goat/sheep milk, such as fresh goat/sheep milk or goat/sheep full cream.

According to a preferred embodiment of the present invention, in the method for producing the deodorized goat/sheep milk, the material is subjected to a carbon dioxide treatment before or after at least any one of the steps during purifying fresh goat/sheep milk or goat/sheep full cream.

According to a preferred embodiment of the present invention, the purifying comprises the following steps of clarifying milk, homogenizing and sterilizing. Illustratively, the carbon dioxide treatment of the material can be carried out prior to the clarifying step, between the clarifying step and the homogenizing step, between the homogenizing step and the sterilizing step, or after the sterilizing step etc.

In the present invention, the above clarifying, homogenizing, and sterilizing steps are conventional procedures in the art for processing goat/sheep milk, and corresponding specific conditions thereof can be determined according to actual demands. For example, the homogenization conditions may be 40-160 MPa, and the sterilization conditions may be 80-95° C./10-25 s and the like.

According to a preferred embodiment of the present invention, the amount of carbon dioxide introduced into the material during the carbon dioxide treatment is 1000-5000 ppm. Furthermore, the amount of carbon dioxide introduced in the present invention includes, but is not limited to, 1000-4500 ppm, 1200-4000 ppm, 1500-3000 ppm, and the like. More preferably, the amount of carbon dioxide introduced is 1500-3000 ppm.

According to a preferred embodiment of the present invention, during the carbon dioxide treatment, the refrigeration temperature is 1-5° C., more preferably 3-4° C.

According to a preferred embodiment of the invention, during the carbon dioxide treatment, the refrigeration time is from 2 to 10 h, more preferably from 4 to 8 h.

In the present invention, the method for removing carbon dioxide from the material includes, but is not limited to, conventional physical adsorption, high temperature removal, chemical absorption, and the like.

In order to achieve the above second object, the present invention provides a deodorized goat/sheep milk, wherein the deodorized goat/sheep milk is produced by the above method for producing a deodorized goat/sheep milk.

In order to achieve the above third object, the present invention provides a goat/sheep milk product, wherein the raw material of the goat/sheep milk product includes the above deodorized goat/sheep milk.

The goat/sheep milk product of the present invention includes, but is not limited to, one or more selected from the group consisting of goat/sheep milk powder, goat/sheep whey protein powder, desalted goat/milk whey powder, cheese and yogurt, wherein the goat/sheep milk powder includes, but is not limited to, whole goat/sheep milk powder, skim goat/sheep milk powder and the like.

The specific goat/sheep milk product of the present invention can be produced according to a conventional method for producing a corresponding product in the art. For example, the goat/sheep milk powder can be produced by concentrating and spray drying the deodorized goat/sheep milk, or the goat/sheep milk powder can be produced by subjecting the raw material to standardization, mixing, homogenization, concentration and sterilization, then to a carbon dioxide treatment, and to spray-drying, wherein the raw material may be fresh goat/sheep milk, or goat/sheep full cream, or a goat/sheep milk product that has not been subjected to a carbon dioxide treatment, such as, skim goat/sheep milk powder, goat/sheep whey protein powder. Wherein, after mixing, the liquid has a concentration of 10-22% by weight, and after concentration, the liquid has a concentration of 25-44% by weight.

In the present invention, the used raw materials are commercially available or can be obtained by conventional technical means in the art, unless otherwise specified.

The Beneficial Effects of the Present Invention are as Follows:

The method for producing a deodorized goat/sheep milk of the invention is technologically simple, and high-efficiency deodorizing treatment of the goat/sheep milk can be achieved whilst the nutrients in the goat/sheep milk can be well preserved at the same time, by subjecting the material to a specific carbon dioxide treatment during the production.

The deodorized goat/sheep milk of the invention has no obvious muttony odor, and the nutritional substances of the goat/sheep milk in the product are relatively complete.

In the goat/sheep milk product of the present invention, a goat/sheep milk product having no obvious muttony odor can be obtained by subjecting a raw material to a specific carbon dioxide treatment.

Specific Mode for Carrying Out the Invention

In order to more clearly illustrate the invention, the invention will be further described in conjunction with the following preferred examples. It should be understood by a person skilled in the art that the contents described below are illustrative but not restrictive, and should not be construed as limiting the scope of the invention.

EXAMPLE 1

A method for producing a deodorized goat/sheep milk comprising the following steps of:

subjecting fresh goat/sheep milk to carbon dioxide treatment: 4000 ppm carbon dioxide was introduced into fresh goat/sheep milk and then the goat/sheep milk was refrigerated at 4° C. for 4 h, and the carbon dioxide was removed from the material by a high temperature removing process; then the goat/sheep milk was clarified, homogenized at a pressure of 60 MPa, sterilized at 90° C. for 10 s and cooled at 4° C. for 2 hours to obtain the deodorized goat/sheep milk; and the obtained goat/sheep milk had a strong smell of milk and a good mouth-feel.

EXAMPLE 2

A method for producing a deodorized goat/sheep milk comprising the following steps of:

clarifying fresh goat/sheep milk, and subjecting the clarified goat/sheep milk to a carbon dioxide treatment: 2000 ppm carbon dioxide was introduced into the clarified goat/sheep milk and then the goat/sheep milk was refrigerated at 5° C. for 8 h, and the carbon dioxide was removed from the material by a high temperature removing process; then the goat/sheep milk was homogenized at a pressure of 100 MPa, sterilized at 85° C. for 20 s and cooled at 5° C. for 4 hours to obtain the deodorized goat/sheep milk; and the obtained goat/sheep milk had a strong smell of milk and a good mouth-feel.

EXAMPLE 3

A method for producing a deodorized goat/sheep milk comprising the following steps of:

clarifying fresh goat/sheep milk, homogenizing the clarified goat/sheep milk at a pressure of 120 MPa, and subjecting the homogenized goat/sheep milk to a carbon dioxide treatment: 3000 ppm carbon dioxide was introduced into the homogenized goat/sheep milk and then the goat/sheep milk was refrigerated at 2° C. for 2 h, and the carbon dioxide was removed by a physical adsorption process; then the goat/sheep milk was sterilized at 90° C. for 15 s and cooled at 5° C. for 4 hours to obtain the deodorized goat/sheep milk; and the obtained goat/sheep milk had a strong smell of milk and a good mouth-feel.

EXAMPLE 4

A method for producing a deodorized goat/sheep milk comprising the following steps of:

clarifying fresh goat/sheep milk, homogenizing the clarified goat/sheep milk at a pressure of 80 MPa, sterilizing the homogenized goat/sheep milk at 80° C. for 20 s, and subjecting the sterilized goat/sheep milk to a carbon dioxide treatment: 2000 ppm carbon dioxide was introduced into the sterilized goat/sheep milk and then the goat/sheep milk was refrigerated at 5° C. for 6 h, and the carbon dioxide was removed by a physical adsorption process to obtain the deodorized goat/sheep milk; and the obtained goat/sheep milk had a strong smell of milk and a good mouth-feel.

EXAMPLE 5

Whole goat/sheep milk powder, desalted goat/sheep milk powder, goat/sheep whey protein powder, and vegetable oil, etc. were pre-mixed so that the fluid milk had a concentration of 18 wt % after the mixing and a concentration of 38 wt % after concentration; then 3000 ppm of carbon dioxide was introduced into the mixture, and the mixture was stored at 4° C. for 4 hours and spray dried to obtain the goat/sheep milk powder; and the obtained goat/sheep milk powder had no obvious muttony odor.

EXAMPLE 6

The deodorized goat/sheep milk obtained in Example 1 was concentrated and spray-dried to obtain goat/sheep milk powder; and the obtained goat/sheep milk powder had no obvious muttony odor.

The deodorized goat/sheep milk produced in Example 1 was used as a raw material, and a corresponding product was produced according to a conventional method for producing whey protein powder, yoghurt, cheese or desalted whey powder; and the obtained products had no obvious muttony odor.

TEST EXAMPLE 1

The deodorizing effects of the products obtained in the examples and the comparative examples were tested.

Evaluation criteria: the evaluation team consists of 15 persons who are sensitive to muttony odor of goat/sheep milk. First of all, the samples of the product in each of the examples were heated in a 30° C. water bath for 30 minutes, and then the muttony odor thereof was scored by a 10-point scaling method, wherein 1-3 scores means almost no muttony odor, 3-5 scores means slight muttony odor, 5-7 scores means moderate muttony odor, 7-9 scores means obvious muttony odor, and 9-10 scores means strong muttony odor. A blank control was employed, and 3 parallel tests were carried out for each treatment. X means the score of muttony odor before treatment and y means the score of muttony odor after treatment, and the deodorizing $$\text{rate} = \frac{x-y}{x} \times 100\%.$$

The deodorizing rates of products obtained in various examples were shown in the following Table 1:

TABLE 1 deodorizing rates of deodorized goat/sheep milks obtained in various examples

| Sample | Deodorizing rate |
| --- | --- |
| Example 1 | 58.31 ± 0.10% |
| Example 2 | 60.25 ± 0.14% |
| Example 3 | 61.22 ± 0.13% |
| Example 4 | 62.21 ± 0.18% |

The above-described examples of the present invention are merely exemplified to clearly illustrate the present invention and not to limit the embodiments of the present invention. Other variations or modifications of the various forms may be made by a person skilled in the art in light of the above description. It is not possible to exhaust all implementations herein. It is to be understood that various obvious variations and modifications derived from the technical solutions of the present invention are still within the scope of the invention.

What is claimed is:

1. A method for producing a deodorized goat/sheep milk, wherein the method comprises purifying a fresh goat/sheep milk or goat/sheep full cream, wherein the fresh goat/sheep milk or goat/sheep full cream is subjected to a carbon dioxide treatment during purification, and the carbon dioxide treatment comprises: introducing carbon dioxide into the fresh goat/sheep milk or goat/sheep full cream, refrigerating the fresh goat/sheep milk or goat/sheep full cream, and removing carbon dioxide.

2. The method according to claim 1, wherein the carbon dioxide treatment is carried out before or after at least any one of the steps during the purification.

3. The method according to claim 1, wherein the purifying comprises steps of clarifying, homogenizing and sterilizing.

4. The method according to claim 1, wherein during the carbon dioxide treatment, the amount of carbon dioxide introduced into the material is within a range of from 1000-5000 ppm.

5. The method according to claim 4, wherein during the carbon dioxide treatment, the amount of carbon dioxide introduced into the material is within a range of from 1500-3000 ppm.

6. The method according to claim 1, wherein during the carbon dioxide treatment, the refrigeration temperature is within a range of from 1-5° C.

7. The method according to claim 6, wherein during the carbon dioxide treatment, a refrigeration time is within a range of from 2 to 10 hours.

8. The method according to claim 1, wherein during the carbon dioxide treatment, the refrigeration temperature is within a range of from 3-4° C.

9. The method according to claim 6, wherein during the carbon dioxide treatment, a refrigeration time is within a range of from 4 to 8 hours.

* * * * *